United States Patent [19]
Sun et al.

[11] Patent Number: 5,598,059
[45] Date of Patent: Jan. 28, 1997

[54] AC TFEL DEVICE HAVING A WHITE LIGHT EMITTING MULTILAYER PHOSPHOR

[75] Inventors: Sey-Shing Sun, Beaverton; Richard T. Tuenge, Hillsboro, both of Oreg.

[73] Assignee: Planar Systems, Inc., Beaverton, Oreg.

[21] Appl. No.: 424,222

[22] Filed: Apr. 19, 1995

Related U.S. Application Data

[63] Continuation-in-part of Ser. No. 234,567, Apr. 28, 1994, abandoned.

[51] Int. Cl.$^6$ ............................... H01J 1/62; H01J 63/04
[52] U.S. Cl. ........................... 313/509; 313/503; 313/506
[58] Field of Search ................................. 313/506, 503, 313/512, 509

[56] References Cited

U.S. PATENT DOCUMENTS

| | | | |
|---|---|---|---|
| 3,639,254 | 2/1972 | Peters | 252/301.4 S |
| 4,983,469 | 1/1991 | Huzino et al. | 313/506 |
| 5,147,835 | 9/1992 | Franzak et al. | 501/134 |
| 5,309,070 | 5/1994 | Sun et al. | 313/503 |
| 5,346,776 | 9/1994 | Taniguchi et al. | 313/506 |

OTHER PUBLICATIONS

Tanaka, et al. "Bright White–Light Electroluminescence Based on Nonradiative Energy Transfer In Ce– and Eu–doped SrS Thin Films", Appl. Phys. Lett. vol. 51, No. 21, 23 Nov. 1987, pp. 1661–1663.

Tanaka, et al. "White Light Emitting Thin–Film Electroluminescent Devices With SrS:Ce,Cl/ZnS:Mn Double Phosphor Layers," Japanese Journal of Applied Physics, vol. 25, No. 3, Mar. 1986, pp. L225–L227.

Ono, et al. "White–Light Emitting Thin Film Electroluminescent Devices With Stacked SrS:Ce/CaS:Eu active Layers," J. Appl. Phys. 66(11), 1 Dec. 1989, pp. 5564–5570.

Mauch, et al. "ZnS:Mn/SrS:Ce Multilayer Devices for Full–Color EL Applications", SID 93 Digest, pp. 769–772.

Barrow, et al., "A New Class of Blue TFEL Phosphors With Application to a VGA Full–Color Display," SID 93 Digest, pp. 761–764.

Tanaka, et al., "Stable White SrS:Ce,K,Eu TFEL with Filters for Full–Color Devices," SID 89 Digest, pp. 321–324.

Nire, et al., "Multi–Color TFEL Display Panel with Double–Hetero–Interface Structured Active Layer," (four pages printed material, no page numbers or other identification).

Leppanen, et al., "Broadband Double Layer Phosphor for an Inverted Filtered RGB Electroluminescent Display," (four pages of material, no page numbers or other identification).

King, et al., "Full–Color 320×240 TFEL Display Panel," pp. 14–17.

*Primary Examiner*—Michael Horabik
*Assistant Examiner*—Michael Day
*Attorney, Agent, or Firm*—Chernoff, Vilhauer, McClung & Stenzel

[57] ABSTRACT

An AC thin film electroluminescent (TFEL) device includes a multilayer phosphor for emitting white light having improved emission intensity in the blue region of the spectrum. The multilayer stack consists of an inverted structure thin film stack having a red light emitting manganese doped zinc sulfide (ZnS:Mn) layer disposed on a first insulating layer; a blue-green light emitting cerium doped strontium sulfide (SrS:Ce) layer disposed on the red light emitting layer; and a blue light emitting cerium activated thiogallate phosphor ($Sr_xCa_{1-x}Ga_2S_4$:Ce) layer disposed on the blue-green light emitting layer. The manganese doped zinc sulfide layer acts as a nucleating layer that lowers the threshold voltage, and the cerium activated thiogallate phosphor layer provides a moisture barrier for the hydroscopic cerium doped strontium sulfide layer. The white light from the multilayer phosphor can be appropriately filtered to produce any desired color.

5 Claims, 5 Drawing Sheets

AC TFEL DEVICE HAVING A WHITE LIGHT EMITTING MULTILAYER PHOSPHOR

This is a continuation-in-part of application Ser. No. 08/234,567 filed on Apr. 28, 1994, now abandoned.

BACKGROUND OF THE INVENTION

This invention relates to an ac thin film electroluminescent (AC TFEL) device and more particularly to an AC TFEL device having a white light emitting multilayer phosphor material.

White light emission can be obtained by combining three primary color emissions, for example, by combining red, green and blue light emissions, or by combining complimentary color emissions. Thus, white light emission can be obtained from a single thin film phosphor layer having emissions in the red, green and blue regions of the color spectrum. The emission spectrum of a white light emitting phosphor may consist of either narrow emission bands at appropriate wavelengths for red, green and blue light or a broad emission band extending over the entire visible spectrum. White light emissions can also be obtained by combining phosphor layers, each of which may emit light primarily in a single region of the color spectrum.

Current attempts to produce full color thin film electroluminescent panels typically include fabricating panels having one of two different basic phosphor structures: (a) a patterned structure where stripes of three primary color light-emitting phosphors are deposited side by side on a common electrode/insulator substrate or (b) a layered structure which may include single or multiple phosphor layers emitting either white light, or the three main spectral components of white light, combined with patterned color filters. It is also known to combine the two basic phosphor structures into a hybrid structure having side-by-side patterned red and green light-emitting phosphor stripes on one substrate combined with an unpatterned blue light-emitting layer on a second substrate. In order to fabricate a full color EL device using a broad band white light-emitting phosphor, the broad band emitting phosphor must provide significant emission intensity over a wide wavelength range in order to achieve three sufficiently bright saturated primary colors when combined with suitable color filters.

Tanaka and others, in "Bright White-Light Electroluminescence Based on Nonradiative Energy Transfer in Ce- and Eu-doped SrS Thin Films," 51 *Appl. Phys Lett.*, 1661 (Nov. 1987), report a single layer white light-emitting phosphor, SrS:Ce,Eu,K, which emits electroluminescence over a broad band.

Tanaka and others, in "White Light Emitting Thin-Film Electroluminescent Devices with SrS:Ce,Cl/ZnS:Mn Double Phosphor Layers," 25 *Jpn. J. Appl. Phys.* L225 (Mar. 1986), disclose a multiple-layered white light emitting phosphor consisting of a greenish-blue light emitting SrS:Ce,Cl and a yellowish-orange light emitting ZnS:Mn.

Ono and others, in "White-Light Emitting Thin Film Electroluminescent Devices with Stacked SrS:Ce/CaS:Eu Active Layers," 66 *J. Appl. Phys.*, 5564 (Dec. 1989), disclose a white light emitting phosphor obtained by stacking layers of blue-green light emitting SrS:Ce and red light emitting CaS:Eu.

Mauch and others, in "ZnS:Mn/SrS:Ce Multilayer Devices for Full-Color EL Applications," *SID 93 Digest*, 769 (1993), disclose a broad band emitting phosphor consisting of multiple layers of manganese-doped zinc sulfide and cerium-doped strontium sulfide (ZnS:Mn/SrS:Ce), where nine such double layers are employed.

None of these known phosphors exhibits significant emission intensity in the blue region of the spectrum, 450–480 nm. The major peak of cerium emission in strontium sulfide is located at 480 nm. Thus, very little deep blue emission can be obtained through filtering the emission of a cerium-doped strontium sulfide phosphor. Low emission intensity at the 450–480 nm wavelengths will limit the color gamut in the blue region that can be achieved for a color-filtered full color panel and will affect the chromaticity of the combined white color.

Barrow and others, in "A New Class of Blue TFEL Phosphors with Application to a VGA Full-Color Display," *SID 93 Digest* 761 (1993), disclose a hybrid phosphor structure for a full-color display panel consisting of patterned red light-emitting zinc sulfide doped with manganese (ZnS:Mn) and patterned green light-emitting zinc sulfide doped with terbium (ZnS:Tb) phosphors and a cerium activated calcium thiogallate phosphor layer ($CaGa_2S_4$:Ce) as the unfiltered blue light emitter. However, both the patterned phosphor structure and the hybrid phosphor structure are difficult to manufacture in the very high resolution structures, about 1000 lines per inch, required for head mounted display panels.

What is still needed is a broad band or white light emitting phosphor having improved emission intensity in the blue region and a large color gamut.

SUMMARY OF THE INVENTION

The present invention addresses the problems of the known broad band emitting phosphors by providing a multilayer white light-emitting phosphor material for an AC TFEL device which has an improved emission intensity in the blue region and a wide color gamut. In one embodiment the multilayer phosphor material consists of a red light-emitting phosphor layer and an alkaline earth thiogallate phosphor layer which includes a rare earth activator dopant RE taken from the group cerium and europium, the multilayer phosphor material having light emissions in the green portion of the spectrum. The alkaline earth thiogallate phosphor layer can be represented by the formula $Ca_xSr_{1-x}Ga_2S_4$:RE, where x is a number between 0 and 1. Calcium and strontium are thus each present in the blue light-emitting thiogallate layer.

The peak wavelength measured for an alkaline earth thiogallate phosphor varies as a function of the alkaline earth ion. Peak wavelengths of 459, 445, and 452 nm, respectively, are obtained for cerium activated calcium thiogallate, strontium thiogallate and barium thiogallate. Thus, by adjusting the ratio of calcium to strontium and by the selection of the rare earth dopant in the thiogallate layer more saturated blue color and the desired color gamut is obtained for the phosphor material.

In a second embodiment of the present invention a white light-emitting multilayer phosphor for an AC TFEL device has a phosphor material consisting of at least one red light-emitting phosphor layer and at least one alkaline earth thiogallate phosphor layer including a dopant. The alkaline earth is taken from the group calcium and strontium, and the dopant is a rare earth activator dopant taken from the group cerium and europium. At least one alkaline earth thiogallate phosphor layer of the multilayer phosphor includes more than one dopant. A thiogallate layer which is doped with both cerium and europium provides enhanced emission in both the blue and green regions of the spectrum.

In a third embodiment of the present invention, a white light-emitting multilayer phosphor material consists of an alkaline earth thiogallate phosphor layer including a rare earth dopant, and an alkaline earth sulfide phosphor layer including a rare earth dopant. The alkaline earth is taken from the group calcium and strontium, and the rare earth dopant is taken from the group cerium and europium. The multilayer phosphor material has light emissions in at least both the red and green portions of the spectrum. Combining an alkaline earth thiogallate phosphor layer and an alkaline earth sulfide phosphor layer, each layer including a rare earth dopant, provides enhanced emission in the blue region of the spectrum.

Each embodiment of the present invention thus provides a white light-emitting phosphor having an improved emission intensity in the blue region and a large color gamut.

An AC thin film electroluminescent (TFEL) device including a white light-emitting multilayer phosphor consists of a first electrode deposited on a transparent substrate, a second electrode, at least two insulating layers located between the first and second electrodes, and a white light-emitting multilayer phosphor material of the present invention as described above sandwiched between the two insulating layers.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENTS

Figure 1:
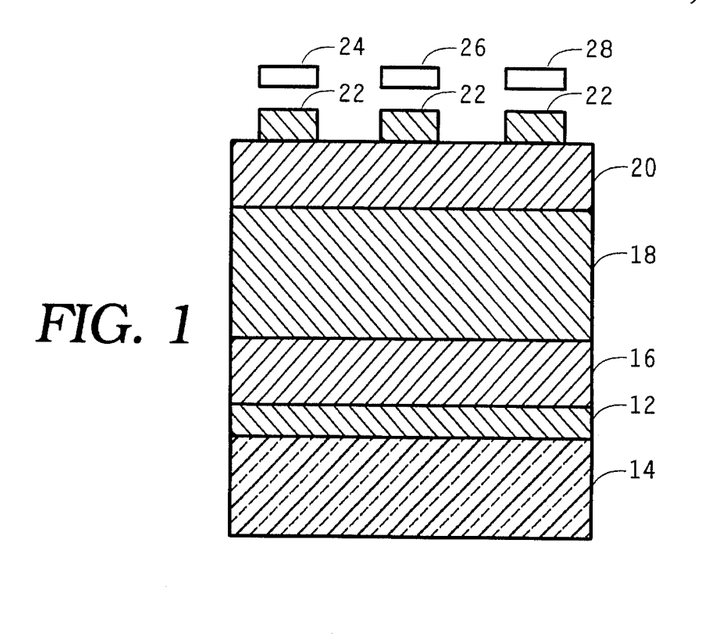
FIG. 1 is a sectional view of a schematic diagram of a portion of an AC TFEL device constructed according to the present invention.

Referring to FIG. 1, a TFEL laminate structure 10 embodying the present invention includes a first electrode 12 deposited on a transparent glass substrate 14. The first electrode 12 is a film of a transparent material such as indium tin oxide (ITO) or a metal which is preferably a refractory metal such as molybdenum. A first insulator layer 16, which is composed of a layer of aluminum oxide-titanium dioxide ($Al_2O_3$—$TiO_2$ or aluminate-titanate, commonly known as ATO), a barium tantalate ($BaTa_2O_6$), or an insulator material having a perovskite structure such as strontium titanate ($SrTiO_3$), is deposited on the first electrode 12. A white light-emitting multilayer phosphor material 18 is located between the first insulator layer 16 and a second insulator layer 20. The second insulator layer 20 is either an aluminate-titanate (ATO) or a barium tantalate ($BaTa_2O_6$). Other insulating layers such as silicon oxynitride (SiON), silicon nitride ($Si_3N_4$) or $Sr(Ti,Zr)O_3$, a mixed strontium titanate and zirconate, can also be used for the first insulator layer, and insulating layers such as ATO, SiON or $Si_3N_4$ can also be used for the second insulator layer. The insulator layers typically each have a thickness of about 300 nm. A second electrode 22 is deposited over the second insulator layer 20.

Referring to FIG. 1, in a preferred embodiment of the present invention, the electrode 12 adjacent the transparent glass substrate 14 is a metal electrode such as a molydenum film. The first insulator layer 16 adjacent the metal electrode is an aluminum oxide-titanium dioxide (ATO) and the second insulator layer 20 is barium tantalate ($BaTa_2O_6$). The second electrode 22 is a transparent conductor electrode such as an ITO electrode. Such an electrode structure, wherein a metal electrode is adjacent the transparent substrate, is herein referred to as an inverted electrode configuration or structure.

As depicted schematically in FIG. 1, a full color or multicolor AC TFEL device can be fabricated with an inverted electrode configuration using a white light-emitting phosphor with patterned red 24, green 26 and blue 28 filters over each pixel. One of the pixel's electrodes is subdivided so that either only part of the pixel under each of the red, green and blue filters, or combinations of the subpixels, can be energized at the same time. Any color hue within the boundaries of the triangular region determined by connecting the CIE coordinates of the respective red, green and blue color emissions can be obtained by varying the ratio of the voltages supplied to the individual subpixels.

Figure 2:
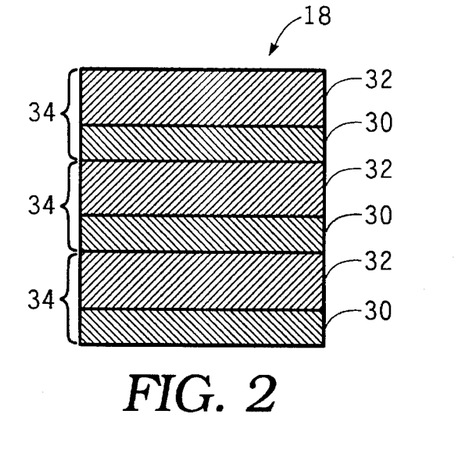
FIG. 2 is an enlarged sectional view of a portion of the TFEL device shown in FIG. 1.

Referring to FIG. 2, in one embodiment of the present invention the white light-emitting multilayer phosphor material 18 is composed of a red light-emitting phosphor layer and an alkaline earth thiogallate phosphor layer including a rare earth dopant RE, the thiogallate layer being represented by the formula $Ca_xSr_{1-x}Ga_2S_4$:RE. The rare earth dopant is taken from the group cerium and europium, and x is a number between 0 and 1. The thickness of each phosphor layer and the ratio between strontium and calcium in the thiogallate layer can be adjusted to achieve the desired color gamut and luminescence. As shown schematically in FIG. 2, an example of such a multilayer phosphor material consists of a red light-emitting zinc sulfide phosphor layer 30 having a dopant manganese, represented by the formula ZnS:Mn, and an alkaline earth thiogallate phosphor layer 32 having the dopant cerium. One such zinc sulfide phosphor layer and one such alkaline earth thiogallate phosphor layer form a stack 34. Up to 25 stacks may be combined to form the multilayer phosphor material 18. When x is 0.5, one stack of such a multilayer phosphor material is represented by the formula $Ca_{0.5}Sr_{0.5}Ga_2S_4$:Ce/ZnS:Mn. When describing a multi-layer structure the use of the slash mark (/) indicates that the compounds are separate layers.

Figure 3:
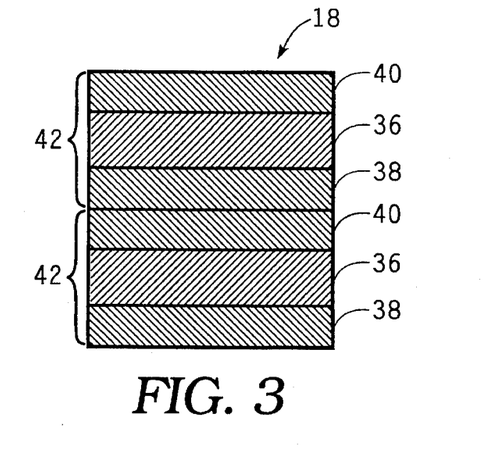
FIGS. 3–7 are alternative embodiments of the portion of the TFEL device shown in FIG. 2.

As shown schematically in FIG. 3, an alkaline earth thiogallate phosphor layer 36 having the dopant cerium, which provides the blue and some green component in the emission spectrum, is sandwiched between a zinc sulfide phosphor layer 38 having the dopant manganese, which provides the red component, and a zinc sulfide phosphor layer 40 having the dopant terbium, which provides a green component of the emission spectrum. These three layers form a stack 42 of phosphor material, as represented by the formula ZnS:Mn/$Ca_xSr_{1-x}Ga_2S_4$:Ce/ZnS:Tb, where 0<x<1. As illustrated in FIG. 3, more than one stack of the multilayer phosphor material may be deposited to form the white light-emitting multilayer phosphor material. Up to 25 stacks of the phosphor material may be deposited.

Figure 4:
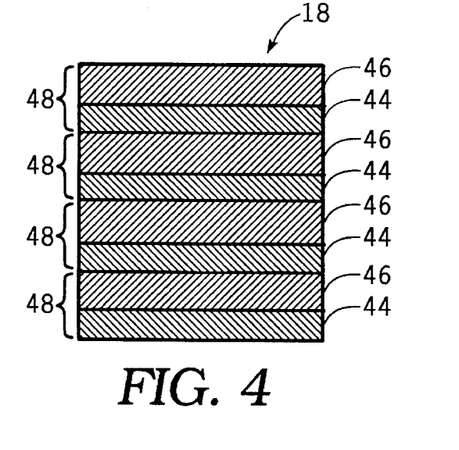

As shown in FIG. 4, in an alternative embodiment of a white light-emitting multilayer phosphor, the multilayer phosphor material 18 consists of at least one red light-emitting phosphor layer and at least one alkaline earth thiogallate phosphor layer including a dopant. The alkaline earth is taken from the group calcium and strontium. The dopant is a rare earth activator dopant taken from the group cerium and europium. At least one alkaline earth thiogallate layer is doped with both cerium and europium. The additional europium doping provides enhanced green emission. The red light-emitting phosphor layer can be a zinc sulfide layer 44 having a dopant manganese. The alkaline earth thiogallate phosphor layer 46 can be represented by the formula $Ca_xSr_{1-x}Ga_2S_4:Ce,Eu$, where $0 \leq x \leq 1$. These two layers form a stack 48 of the phosphor material.

Figure 6:
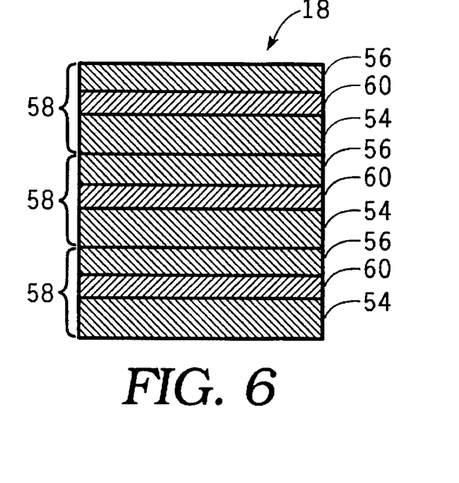

Referring to FIG. 6, in another embodiment of the present invention, the white light-emitting multilayer phosphor material 18 includes an alkaline earth thiogallate phosphor layer having a dopant RE and an alkaline earth sulfide phosphor layer having a dopant RE. The alkaline earth is taken from the group calcium and strontium, and the dopant is a rare earth activator dopant taken from the group cerium and europium. The multilayer phosphor material has light emissions in at least both the red and green portions of the spectrum. One such multilayer phosphor material includes an alkaline earth thiogallate phosphor layer 54 having the dopant cerium and an alkaline earth sulfide phosphor layer 56 having the dopants cerium and europium. The multilayer phosphor material can be deposited to form a stack 58 of the multilayer phosphor material, where the stack is represented by the formula $Ca_xSr_{1-x}Ga_2S_4:Ce/ZnS/Ca_ySr_{1-y}S:Ce,Eu$ where $0 \leq x \leq 1$, and $0 \leq y \leq 1$. The alkaline earth sulfide phosphor layer 56 with dopants cerium and europium provides a broad band emission and the alkaline earth thiogallate phosphor layer 54 provides enhanced emission in the blue region of the spectrum. A layer 60 of zinc sulfide is located between the thiogallate phosphor layer and the alkaline earth sulfide phosphor layer.

Figure 7:
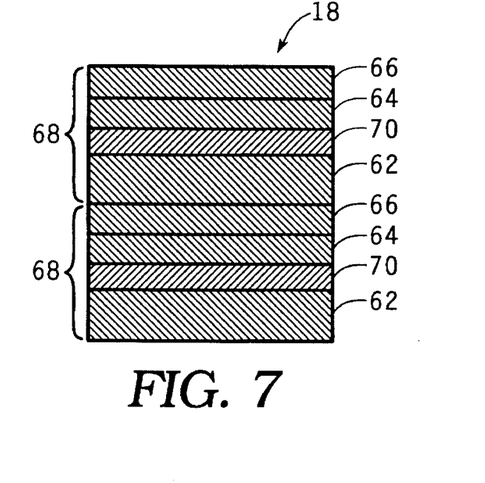

Alternatively, as shown in FIG. 7, the multilayer phosphor material 18 may include the blue light-emitting alkaline earth thiogallate phosphor layer 62 having the dopant cerium, a blue-green light emitting strontium sulfide phosphor layer 64 having the dopant cerium and a red light-emitting calcium sulfide phosphor layer 66 having the dopant europium. The multilayer phosphor material can be deposited to form a stack 68 represented by the formula $Ca_xSr_{1-x}Ga_2S_4:Ce/ZnS/SrS:Ce/CaS:Eu$, where $0 \leq x \leq 1$. A layer 70 of zinc sulfide is located between the thiogallate phosphor layer and the alkaline earth sulfide phosphor layers.

Figure 5:
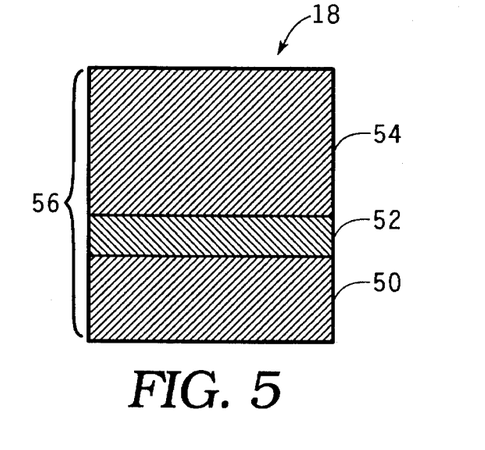

As shown in FIG. 5, another such multilayer phosphor consists of a blue light-emitting alkaline earth thiogallate phosphor layer including the dopant cerium, a red light-emitting zinc sulfide layer including a dopant manganese, and a blue-green light-emitting strontium sulfide phosphor layer including the dopant cerium. The phosphor material may be deposited in layers to form a stack 56 represented by the formula $Ca_xSr_{1-x}Ga_2S_4:Ce/ZnS:Mn/SrS:Ce$, where $0 \leq x \leq 1$. When x is 1, the alkaline earth thiogallate layer 50 having the dopant cerium is represented by the formula $CaGa_2S_4:Ce$, the zinc sulfide phosphor layer 52 including the dopant manganese is represented by the formula ZnS:Mn, the strontium sulfide phosphor layer 54 including the dopant cerium is represented by the formula SrS:Ce. The phosphor material is represented by the formula $CaGa_2S_4:Ce/ZnS:Mn/SrS:Ce$.

In general, the layers of the white light-emitting phosphor material are deposited using vacuum deposition techniques. Typical thicknesses for the phosphor layers are 500–1500 nm for the alkaline earth sulfide layers and 300–500 nm for the alkaline earth thiogallate layers. However, when the multilayer phosphor material consists of more than one stack, each phosphor layer is between 5 and 50 nm thick and up to 25 stacks may be deposited to form the multilayer phosphor.

To prepare a single stack of the multilayer white light emitting phosphor represented by the formula $CaGa_2S_4:Ce/ZnS:Mn/SrS:Ce$ shown in FIG. 5, first the blue light-emitting cerium activated calcium thiogallate phosphor 50 is deposited in a layer 200 to 400 nm thick. The red light-emitting manganese doped zinc sulfide phosphor 52 is deposited in a layer 150 to 300 nm thick atop the thiogallate layer. Finally, the blue-green light-emitting cerium doped strontium sulfide phosphor layer 54 is deposited in a layer 600 to 1200 nm thick. Each phosphor layer can be deposited by a vacuum deposition technique such as sputtering or atomic layer epitaxy.

Figure 8:
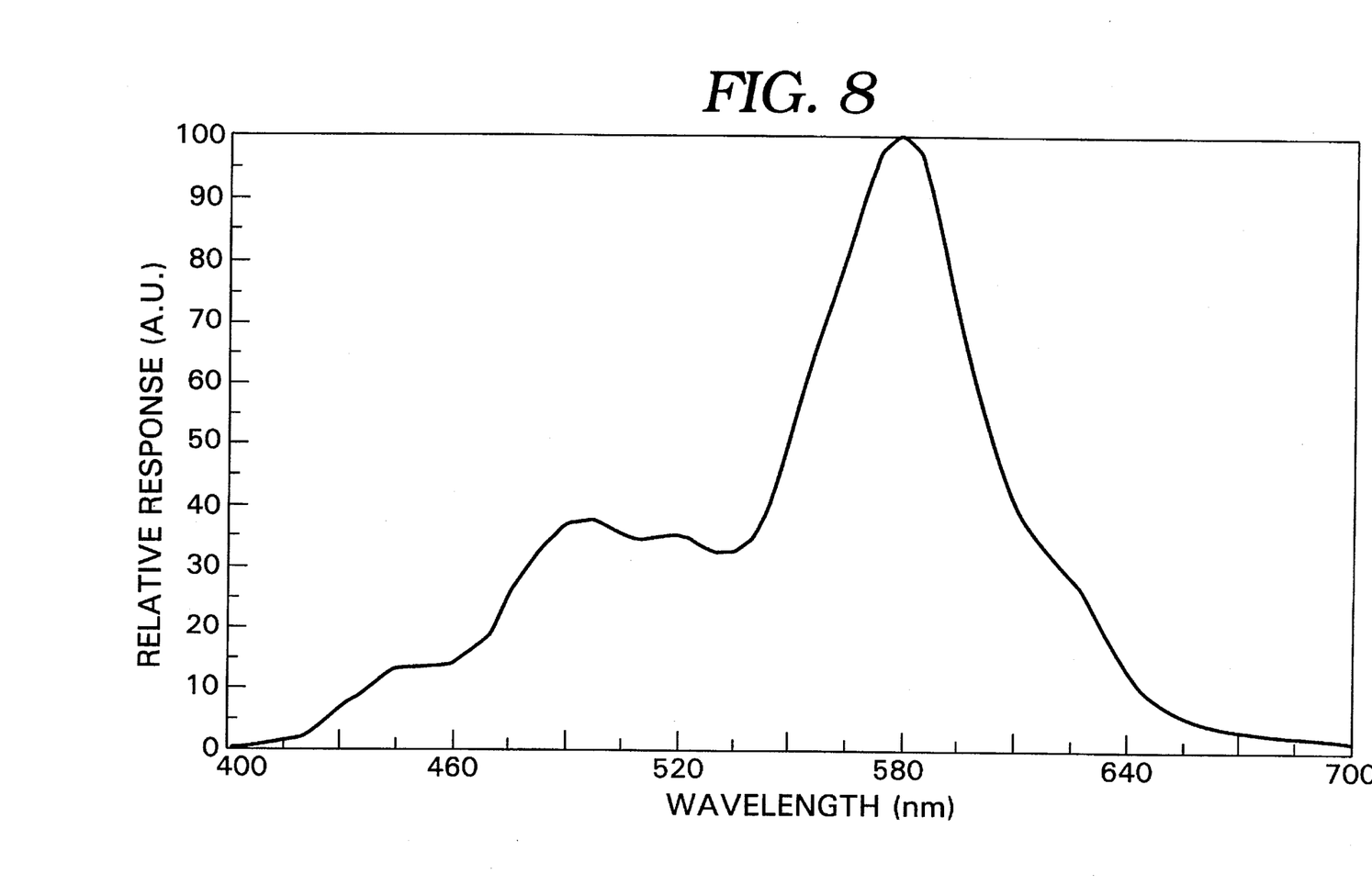
FIGS. 8 and 9 show emission spectra of multilayer phosphors embodying the present invention.

FIG. 8 shows a calculated emission spectrum of $CaGa_2S_4:Ce/ZnS:Mn/SrS:Ce$ obtained by superimposing a ZnS:Mn/SrS:Ce spectrum and a $CaGa_2S_4:Ce$ emission spectrum, both of which were measured under the same frequency, pulse width and drive voltage above threshold. The relative intensities of the emission at selected wavelengths in the blue region are listed in Table 1. The CIE coordinates for the unfiltered white light emission of $CaGa_2S_4:Ce/ZnS:Mn/SrS:Ce$ are x=0.39, y=0.44.

TABLE 1

| Wavelength | $CaGa_2S_4:Ce/ZnS:Mn/SrS:Ce$ Relative Intensity |
| --- | --- |
| 450 nm | 13% |
| 460 nm | 23% |
| 470 nm | 36% |
| 480 nm | 41% |

As shown in Table 1, a white light-emitting multilayer phosphor of the present invention, $CaGa_2S_4:Ce/ZnS:Mn/SrS:Ce$, exhibits significant emission intensity in the blue region of the spectrum.

Figure 9:
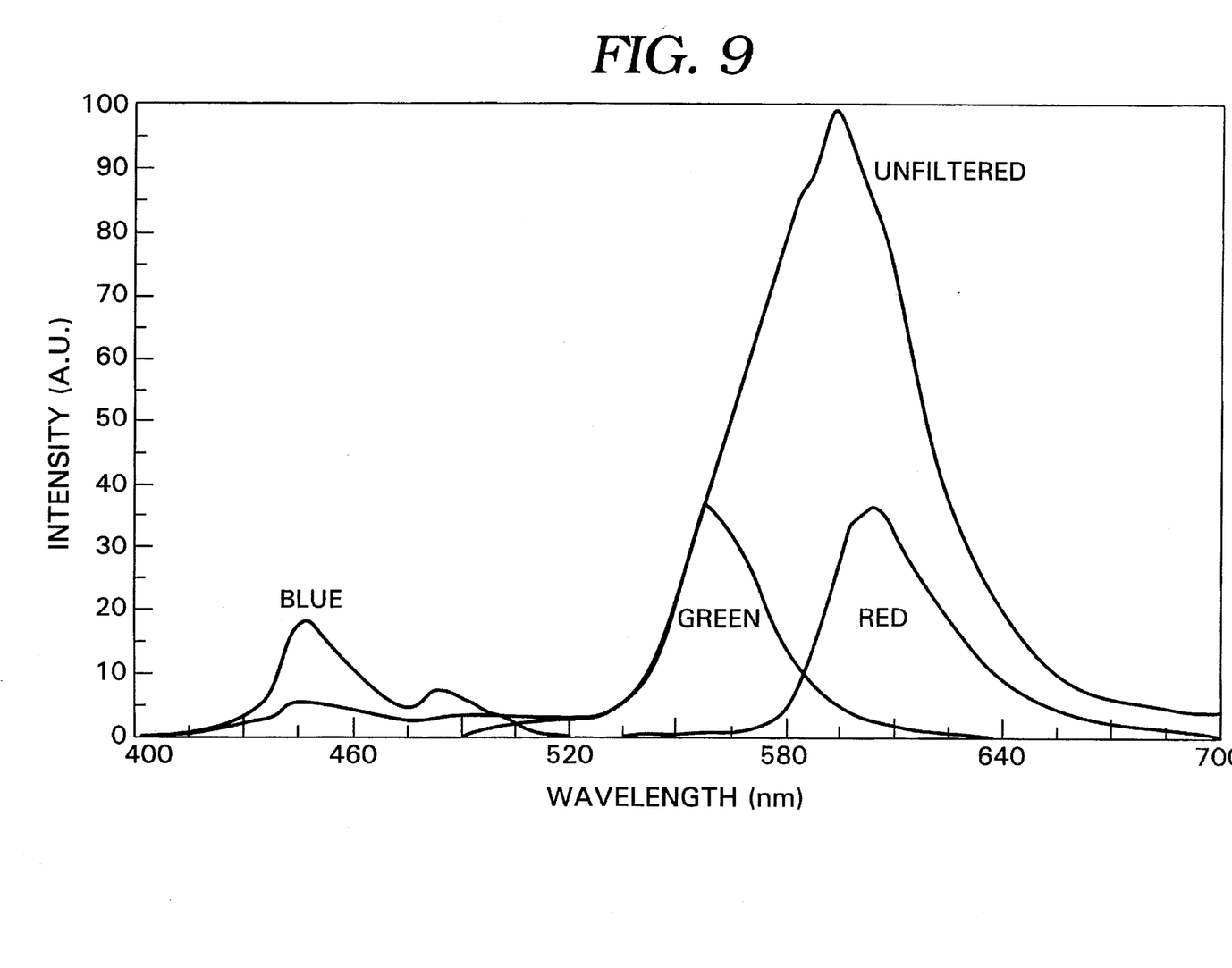
Figure 10:
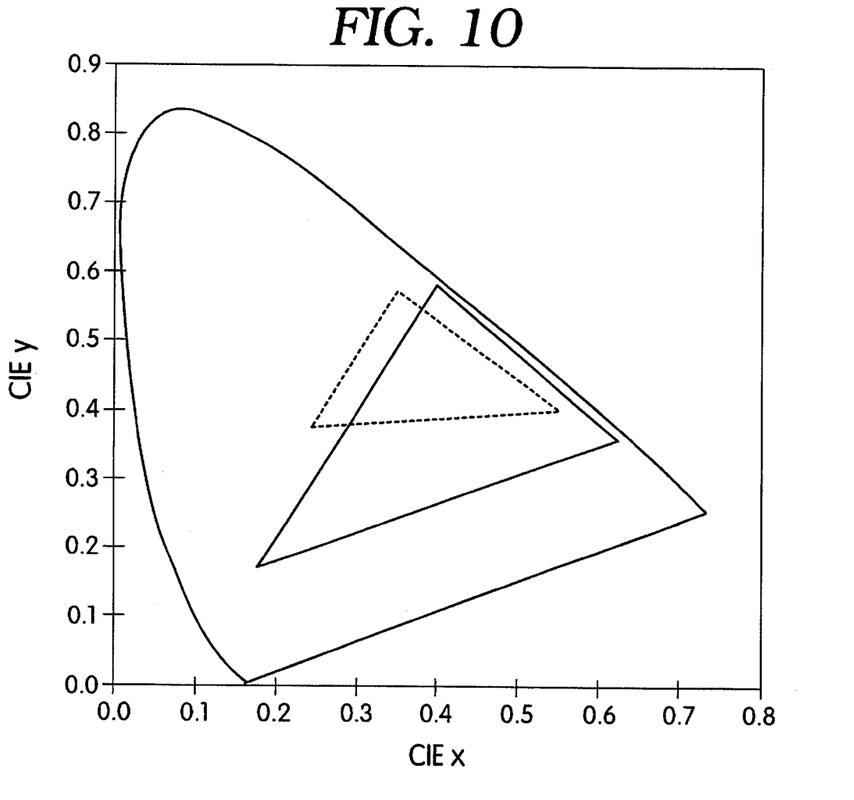
FIG. 10 shows a CIE chromaticity diagram of a multilayer phosphor embodying the present invention.

The unfiltered emission spectrum of a single stack of the multilayer phosphor material represented by the formula $ZnS/Ca_{0.5}Sr_{0.5}Ga_2S_4:Ce/ZnS:Mn$ is shown in FIG. 9. The relative intensities of the emissions in the red, blue and green regions of the spectrum for the same phosphor material as viewed through red, green and blue filters are also shown in FIG. 9. FIG. 10 shows the CIE 1931 chromaticity diagram showing the color gamut available from the multilayer phosphor material represented by the formula $ZnS/Sr_{0.5}Ca_{0.5}Ga_2S_4:Ce/ZnS:Mn$. The CIE coordinates for the unfiltered phosphor material are x=0.54, y=0.42. For comparison, the dashed lines in FIG. 10 show the color gamut available from the phosphor represented by the formula ZnS:Mn/SrS:Ce.

Figure 11:
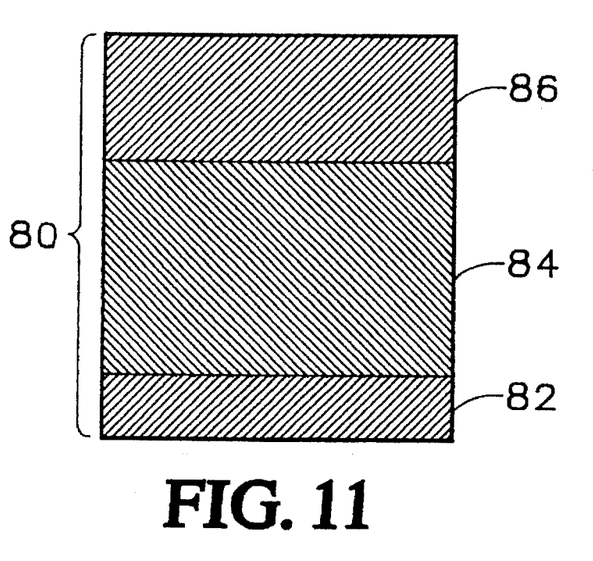
FIG. 11 is a sectional view of a schematic diagram of a preferred embodiment of a multi-layer AC TFEL phosphor material.

Referring now to FIG. 11, a preferred embodiment of the present invention is a single stack 80 of the multilayer white light emitting phosphor having improved emission intensity in the blue region of the spectrum consisting of a red light-emitting zinc sulfide layer 82 including the dopant manganese, represented by the formula ZnS:Mn, a blue-green light-emitting cerium doped strontium sulfide layer 84, represented by the formula SrS:Ce, and a blue light-emitting cerium activated calcium thiogallate phosphor 86, represented by the formula $CaGa_2S_4:Ce$.

To prepare the stack 80, first the red light-emitting manganese doped zinc sulfide phosphor 82, ZnS:Mn, is deposited in a layer 150 to 300 nm thick. The blue-green light-emitting cerium doped strontium sulfide phosphor layer 84, SrS:Ce, is deposited in a layer 600 to 1200 nm thick atop the manganese doped zinc sulfide layer. Finally, the blue light-emitting cerium activated calcium thiogallate phosphor 86, $CaGa_2S_4$:Ce, is deposited in a layer 200 to 400 nm thick. Each phosphor layer preferably is deposited by the vacuum deposition technique of sputtering.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An AC thin film electroluminescent (TFEL) device including a plurality of phosphor layers for forming a white light-emitting phosphor comprising:

(a) a bottom substrate;

(b) a first electrode layer deposited on the bottom substrate;

(c) a first insulating layer deposited on the first electrode layer;

(d) a red light-emitting phosphor layer comprising a ZnS:Mn layer deposited on the first insulating layer;

(e) a blue green light-emitting phosphor layer comprising an SrS:Ce layer deposited on the red light-emitting phosphor layer;

(f) a blue light-emitting phosphor layer comprising a $Sr_x Ca_{1-x} Ga_2S_4$:Ce layer, where $1 \geq x \geq 0$, deposited on the blue green layer;

(g) a transparent second insulating layer placed atop the blue light-emitting phosphor layer; and (h) a transparent second electrode layer deposited on the transparent second insulating layer.

2. The TFEL device of claim 1 wherein the ZnS:Mn layer has a thickness of between 150 and 300 nm, the SrS:Ce layer has a thickness of between 600 and 1200 nm, and the $Sr_x Ca_{1-x} Ga_2S_4$:Ce layer has a thickness of between 200 and 400 nm.

3. The AC TFEL device of claim 2 wherein the ZnS:Mn layer, the SrS:Ce layer and the $Sr_x Ca_{1-x} Ga_2S_4$:Ce layer are all sputtered phosphor layers.

4. The AC TFEL device of claim 1 wherein $x=0.5$.

5. The AC TFEL device of claim 1 wherein $x=0$.

* * * * *

UNITED STATES PATENT AND TRADEMARK OFFICE
CERTIFICATE OF CORRECTION

PATENT NO. : 5,598,059
DATED : January 28, 1997
INVENTOR(S) : Sey-Shing Sun, et al.

It is certified that error appears in the above-indentified patent and that said Letters Patent is hereby corrected as shown below:

Col. 4, Line 10  Delete "molydenum" and insert --molybdenum--.

Col. 5, Line 10  Delete "," after emission and insert --.--.

Signed and Sealed this

Twenty-first Day of July, 1998

Attest:

Attesting Officer

BRUCE LEHMAN

Commissioner of Patents and Trademarks